(12) United States Patent
Gonzalez et al.

(10) Patent No.: US 11,469,516 B2
(45) Date of Patent: Oct. 11, 2022

(54) MULTIBAND ANTENNA SYSTEM

(71) Applicant: Huawei Technologies Co., Ltd., Shenzhen (CN)

(72) Inventors: Ignacio Gonzalez, Munich (DE); Christoph Spranger, Munich (DE); Bruno Biscontini, Munich (DE); Bernhard Rist, Munich (DE); Johann Baptist Obermaier, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 286 days.

(21) Appl. No.: 16/840,088

(22) Filed: Apr. 3, 2020

(65) Prior Publication Data
US 2020/0235487 A1    Jul. 23, 2020

Related U.S. Application Data

(63) Continuation of application No. PCT/EP2017/075136, filed on Oct. 4, 2017.

(51) Int. Cl.
*H01Q 21/12* (2006.01)
*H01Q 21/00* (2006.01)
(Continued)

(52) U.S. Cl.
CPC ......... *H01Q 21/0025* (2013.01); *H01Q 1/241* (2013.01); *H01Q 19/10* (2013.01); *H01Q 21/30* (2013.01); *H04B 7/0452* (2013.01)

(58) Field of Classification Search
CPC .... H01Q 21/0025; H01Q 1/241; H01Q 19/10; H01Q 21/30; H04B 7/0452
See application file for complete search history.

(56) References Cited

U.S. PATENT DOCUMENTS 5,557,291 A    9/1996   Chu et al.
6,239,762 B1   5/2001   Lier
(Continued)

FOREIGN PATENT DOCUMENTS

CN    103840865 A    6/2014
CN    103904437 A    7/2014
(Continued)

OTHER PUBLICATIONS

Uthansakul et al., "Open-Loop Beamforming Technique for MIMO System and Its Practical Realization," XP55459768A, International Journal of Antennas and Propagation. vol. 2011, Article ID 723719, pp. 1-14, Hindawi Publishing Corporation (May 2011).
(Continued)

*Primary Examiner* — Dieu Hien T Duong
(74) *Attorney, Agent, or Firm* — Leydig, Voit & Mayer, Ltd.

(57) ABSTRACT

A multiband antenna system comprises a first massive multiple input multiple output (mMIMO) antenna array comprising a plurality of first antenna elements for use in a first frequency band and at least a second antenna array comprising a plurality of second antenna elements for use in a second frequency band lower than the first frequency band. The second antenna array is at least partially interleaved with the first mMIMO antenna array. The multiband antenna system further includes a distribution network for distributing input and/or output signals of the antenna elements of the second antenna array arranged in a distribution layer, and a transition device.

13 Claims, 2 Drawing Sheets

(51) Int. Cl.
  *H01Q 1/24*   (2006.01)
  *H01Q 19/10*  (2006.01)
  *H01Q 21/30*  (2006.01)
  *H04B 7/0452* (2017.01)

(56) References Cited

U.S. PATENT DOCUMENTS

| | | | |
|---|---|---|---|
| 11,177,565 B2* | 11/2021 | Hojjat | H01Q 5/48 |
| 2004/0201542 A1 | 10/2004 | Gottl et al. | |
| 2009/0322608 A1* | 12/2009 | Adams | H01Q 3/00 |
| | | | 342/368 |
| 2013/0222201 A1 | 8/2013 | Ma et al. | |
| 2015/0085944 A1 | 3/2015 | Mobasher et al. | |
| 2015/0381229 A1 | 12/2015 | Tzanidis et al. | |
| 2017/0170549 A1* | 6/2017 | Buondelmonte | H01Q 21/0075 |
| 2018/0175916 A1* | 6/2018 | Rowell | H01Q 3/40 |

FOREIGN PATENT DOCUMENTS

| | | |
|---|---|---|
| CN | 105122862 A | 12/2015 |
| CN | 106063339 A | 10/2016 |
| CN | 106571518 A | 4/2017 |
| CN | 107005290 A | 8/2017 |
| CN | 107046170 A | 8/2017 |
| CN | 107093598 A | 8/2017 |
| EP | 0056205 A1 | 7/1982 |
| EP | 0627783 A1 | 12/1994 |

OTHER PUBLICATIONS

Jaworski et al., "Dual Frequency & Dual-Linear Polarization Integrated Antenna Array for application in Synthetic Aperture Radar," XP31786387A, Proceedings of the 40th European Microwave Conference (EUMC), pp. 1714-1717, Paris, France (Sep. 2010).

Yulin Zheng et al., "Research of Multi-beams Antenna Array Using Butler Matrix in MIMO Communication," XP32710559A, 2014 3rd Asia-Pacific Conference on Antennas and Propagation, pp. 225-227, Harbin, China (Jul. 2014).

Breitsameter et al, "A circular polarized electronically scanned antenna array with integrated transceiver system," The 7th German Microwave Conference, Ilmenau, Germany, pp. 1-4, Institute of Electrical and Electronics Engineers, New York, New York (Mar. 12-14, 2012).

* cited by examiner

MULTIBAND ANTENNA SYSTEM

CROSS-REFERENCE TO RELATED APPLICATIONS

This application is a continuation of International Application No. PCT/EP2017/075136, filed on Oct. 4, 2017, the disclosure of which is hereby incorporated by reference in its entirety.

TECHNICAL FIELD

The present invention relates to a multiband antenna system, in particular to a multiband antenna system suitable for use in a massive multiple input multiple output (mMIMO) system.

BACKGROUND

Cellular mobile communication systems often need to support multiple communication standards (e.g. LTE, UMTS, GSM) as well as a variety of frequency bands which are determined by regulatory bodies. The use of multiple frequency bands in particular requires the use of different antenna systems adapted to the physical characteristics of each of the frequency bands.

With the growing demand for a deeper integration of antennas with radios, e.g. Active Antenna Systems (AAS), new ways of designing compact multiband antenna systems are being requested without compromising the antenna system performance. Furthermore, with the LTE rollout almost complete, preparations are underway for the upcoming 5G infrastructure. One of the key technologies to enable the next generation of mobile communications is mMIMO below 6 GHz.

Antenna locations for cellular mobile communication systems often are space-restricted so that the use of multiple separate antennas for the different frequency bands is not feasible. Furthermore, site upgrades and new deployments of antenna systems face limiting regulations which will develop slower than technology.

SUMMARY

The present disclosure describes a multiband antenna system, wherein the multiband antenna system overcomes one or more of the above-mentioned problems of the prior art. The present disclosure describes a concept for an improved multiband antenna system.

According to an aspect of the disclosure, a multiband antenna system comprises a first massive multiple input multiple output (mMIMO) antenna array comprising a plurality of first antenna elements for use in a first frequency band. Furthermore the multiband antenna system comprises at least a second antenna array comprising a plurality of second antenna elements for use in a second frequency band lower than the first. The second antenna array is at least partially interleaved with the first mMIMO antenna array. The multiband antenna system according to this aspect comprises a distribution network for distribution of input and/or output signals of the antenna elements of the second antenna array. The distribution network is arranged in a distribution layer. The multiband antenna system according to this aspect further comprises a transition device which in turn comprises a first set of first connectors for connecting to the first mMIMO antenna array, a second set of second connectors for connecting to a mMIMO radio frequency (RF) module as well as interconnections from the first set of first connectors to the second set of second connectors. The interconnections traverse the distribution layer.

The transition device allows signals for the first mMIMO antenna array to be transported through the distribution layer. Thereby it is made possible to interleave first antenna elements of the first mMIMO antenna array with second antenna elements from a second antenna array if the second antenna array uses a distribution network, as usually such a distribution network physically blocks the way for any other signals to be routed towards the first antenna elements. Thus, the transition device allows for the antenna system to be constructed in a compact manner as the different antenna arrays may have overlapping apertures. Due to this compact construction, existing antenna sites may be reused and multiple antenna apertures may be provided in the same space. The required dimensions of a multiband antenna systems are reduced. In addition standard RF modules can be used as the second set of connectors can be arranged to fit to the connectors of the RF module without having to take into account the location of the antenna elements of the mMIMO antenna-array.

In a further implementation of the first aspect, the first mMIMO antenna array comprises a reflector and the distribution layer is arranged in parallel to the reflector. Such an arrangement, in which different parts of the antenna system are oriented in parallel to each other, is very compact and makes it easier to satisfy space constraints.

In a further implementation of the first aspect, the distribution network comprises gaps through which the interconnections traverse the distribution network. Such gaps may be easily placed to allow the traversal of the distribution layer by the transition device. In this way, it is not necessary to employ any additional waveguides to route around the distribution layer.

In a further implementation of the first aspect, each interconnection comprises a first part traversing the distribution network to connect with the first connector, a second part for connecting with the second connector and a connecting part for routing signals between the first part and the second part. In this way, it becomes possible to separate the routing of the signals into two different geometric directions, for example into two orthogonal directions. From this it follows that the transition device may be mostly flat and only the first part and the second part extend in the direction of the antenna arrays. This allows a very compact packing of the transition device together with the other components of the antenna system.

In a further implementation of the first aspect, the distribution network is physically split into distribution sub-networks for different polarisations, wherein the gaps are arranged between the distribution sub-networks. In this way, the gaps may be placed more easily.

In a further implementation of the first aspect, each of the first connectors is connected by one of the interconnections to one second connector. Such a 1 to 1 relationship between the first set of connectors and the second set of connectors allows for each of the antenna elements of the first mMIMO antenna array to be linked to exactly one signal source/sink from the mMIMO RF module.

In a further implementation of the first aspect, the interconnections equalise a phase of each signal for each of the first antenna elements. The transition device thus provides a standardised interface for the second set of connectors. The mMIMO RF module does not need to be explicitly matched to one particular mMIMO antenna array.

In a further implementation of the first aspect, the interconnections have individual physical lengths for providing the equalisation. This kind of equalisation is easy to implement and very reliable.

In a further implementation of the first aspect, the antenna system further comprises an mMIMO RF module for driving the first mMIMO antenna array, wherein the second connectors are connected to the mMIMO RF module.

In a further implementation of the first aspect, the first mMIMO array further comprises a feeding network connected to the first antenna elements and the first connectors are connected to the feeding network. The feeding network simplifies the arrangement of the interconnections, namely their positioning at the gaps in the distribution network. Any RF signals from the first set of connectors may be routed to the actual antenna elements.

In a further implementation of the first aspect, the feeding network provides a feeding connection to more than one of the first antenna elements for one of the first connectors. This may for example be used to implement easy beam tilting.

These and other aspects of the disclosure will be apparent from the embodiment(s) described below.

BRIEF DESCRIPTION OF THE DRAWINGS

To illustrate the technical features of embodiments of the present invention more clearly, the accompanying drawings provided for describing the embodiments are introduced briefly in the following. The accompanying drawings in the following description are merely some embodiments of the present invention, but modifications of these embodiments are possible without departing from the scope of the present invention as defined in the claims.

DETAILED DESCRIPTION

Figure 1:
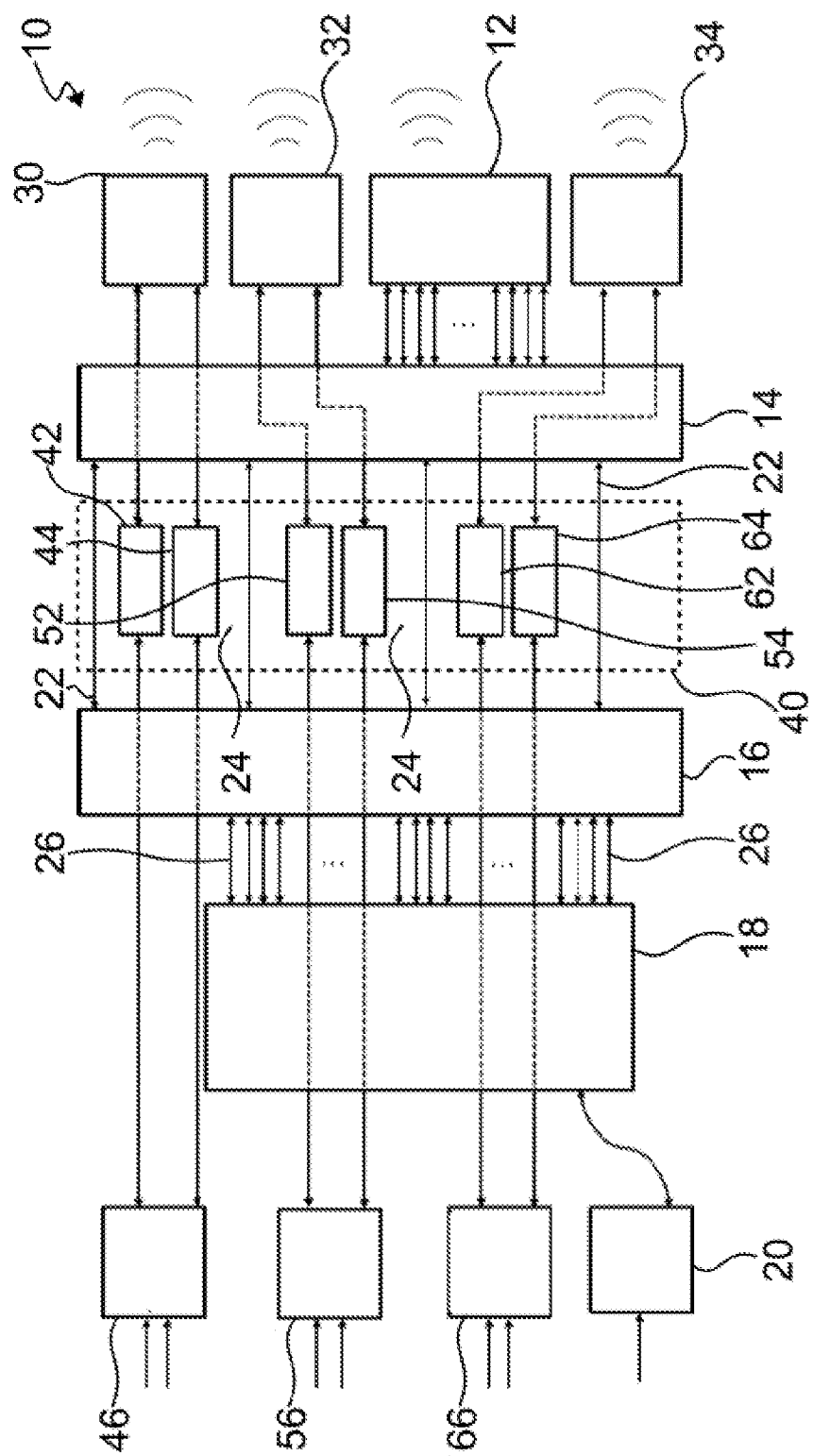
FIG. 1 Shows a schematic view of the structure of a multiband antenna system according to an embodiment.

A multi-band antenna system 10 according to a first embodiment is shown in FIG. 1.

The multi-band antenna system 10 comprises a first mMIMO array 12 comprising a plurality of first antenna elements (not shown). The first mMIMO array 12 comprises a feeding network 14 which is connected to a transition device 16. The feeding network 14 feeds the first antenna elements of the first mMIMO array 12. The transition device 16 is connected to an mMIMO RF module 18 which provides signals to and receives signals from the first mMIMO array 12 through the transition device 16. Digital input signals are routed to the mMIMO RF module 18 from an mMIMO input/output 20.

The multi-band antenna system 10 furthermore comprises a second antenna array 30 which is connected to a distribution network 40. The distribution network 40 comprises a first distribution sub-network 42 for distributing signals for a first e.g. positive (+45°) polarisation and a second distribution sub-network 44 for distributing signals for a second e.g. negative (−45°) polarisation. The first distribution sub-network 42 and the second distribution sub-network 44 are connected to an antenna input/output 46.

In this embodiment there is a third antenna array 32, connected to a first distribution sub-network 52 and a second distribution sub-network 54 which are both connected to another antenna input 56. Furthermore, the multi-band antenna system 10 comprises a fourth antenna array 34, connected to a first distribution sub-network 62 and a second distribution sub-network 64 which is in turn connected to a further antenna input 66.

The transition device 16 comprises first parts 22 which traverse the distribution layer 40 and thus the distribution sub-networks 42, 44, 52, 54, 62, 64 comprised therein to connect with first connectors (not shown in FIG. 1) on the feeding network 14. To allow the first parts 22 to traverse the distribution layer there are gaps 24 between some distribution sub-networks 42, 44, 52, 54, 62, 64, for example between distribution sub-networks of opposite polarisation. There is, for example one gap 24 between the negative polarisation distribution network 44 and the positive polarisation distribution network 52.

The transition device 16 further comprises second parts 26 for connecting to second connectors (not shown in FIG. 1) on the mMIMO RF module 18.

Of the four antenna arrays 12, 30, 32, 34, the first mMIMO antenna array 12 may operate below 6 GHz in a first frequency band. The second, third and fourth antenna arrays 30, 32, 34 may operate in a second frequency band, a third frequency band and a fourth frequency band, respectively. The second, third and fourth frequency band each may comprise frequencies that are lower than those of the first frequency band. The second, third and fourth frequency bands may or may not overlap.

The third antenna array 32 and the fourth antenna array 34 as well as the associated distribution networks 52, 54, 62, 64 and antenna inputs 56, 66 are optional. More or fewer antenna arrays may be provided.

The feeding network 14 may provide a fixed phase and amplitude distribution between the first antenna elements of the first mMIMO antenna array 12. In this way, the feeding network 14 may distribute signals among the first antenna elements in a way to, for example, provide a predetermined beam tilt or other beamforming function. The feeding network 14 thus may provide an interface between the transition device and the antenna elements. The feeding network 14 may be realised as a multilayer printed circuit board, PCB, and may also act as a reflector for the first mMIMO antenna array 12.

The transition device 16 interconnects the feeding network 14 of the first mMIMO antenna array 12 with the mMIMO RF module 18. The transition device 16 is arranged and constructed to physically traverse the distribution layer by means of its first parts 22. The first parts 22 may be arranged such that they traverse the distribution layer through gaps 24 in the distribution layer. These gaps 24 may for example be arranged between each of the distribution sub-networks 42, 44, 52, 54, 62, 64.

The transition device 16 may further equalise the phase of all the first antenna elements of the first mMIMO antenna array 12. This means that the transition device 16 will provide on its second set of second connectors access to the first antenna elements in a defined way such that the mMIMO RF module 18 does not need to have any knowledge about the exact layout and/or construction of the first antenna elements in order to perform correctly. The signal path from the inputs (e.g. the second parts 26) of the transition device 16 to the first antenna elements and/or the feeding network 14 shows equal phase to the outputs of the mMIMO RF module 18. In this way, the transition device 16 may also be adapted to different mMIMO RF modules 18.

The mMIMO RF module 18 may be a radio unit that provides power and signal processing to the first mMIMO antenna array 12. The mMIMO RF module 18 is connected to the first antenna elements of the first mMIMO array 12 through the transition device 16. The mMIMO RF module 18 may control the first antenna elements such that the combination provides an active antenna system (AAS). The mMIMO RF module 18 may be field installable and/or field exchangeable.

The first mMIMO antenna array 12 may be constructed without a feeding network 14. In this case, the transition device 16 may directly connect to the first antenna elements of the first mMIMO antenna array 12 and not go through a feeding network 14. This may be the case in particular if the first mMIMO antenna array 12 comprises only individual first antenna elements that are not grouped. In this case, each of the second connectors connected to the mMIMO RF module 18 corresponds to one first antenna element of the first mMIMO antenna array 12.

The distribution layer 40 may comprise a multitude of distribution sub-networks 42, 44, 52, 54, 62, 64. A distribution sub-network 42, 44, 52, 54, 62, 64 is a device that provides a controllable phase and amplitude distribution from its input to its outputs and vice versa. Accordingly, the distribution layer 40 and/or each of the distribution sub-networks 42, 44, 52, 54, 62, 64 may be considered to provide the function of a phase-shifter. The number of outputs of the distribution layer 40 depends on the configuration of the antenna array 30, 32, 34 it feeds and controls.

In some instances, the distribution layer 40 may have one input per polarisation of the antenna element to feed. One phase-shifting distribution layer 40 may provide its function for two polarisations in the same physical device. In the present embodiment, however, the distribution layer 40 is subdivided into independent components for each polarisation. These components are the distribution sub-networks 42, 44, 52, 54, 62, 64. As these distribution sub-networks 42, 44, 52, 54, 62, 64 are independent of each other, they may be constructed in a way such that there are gaps 24 between them. It is then possible to route the first parts 22 of the transition device 16 through these gaps 24 to make contact with the first mMIMO array 12.

Figure 2:
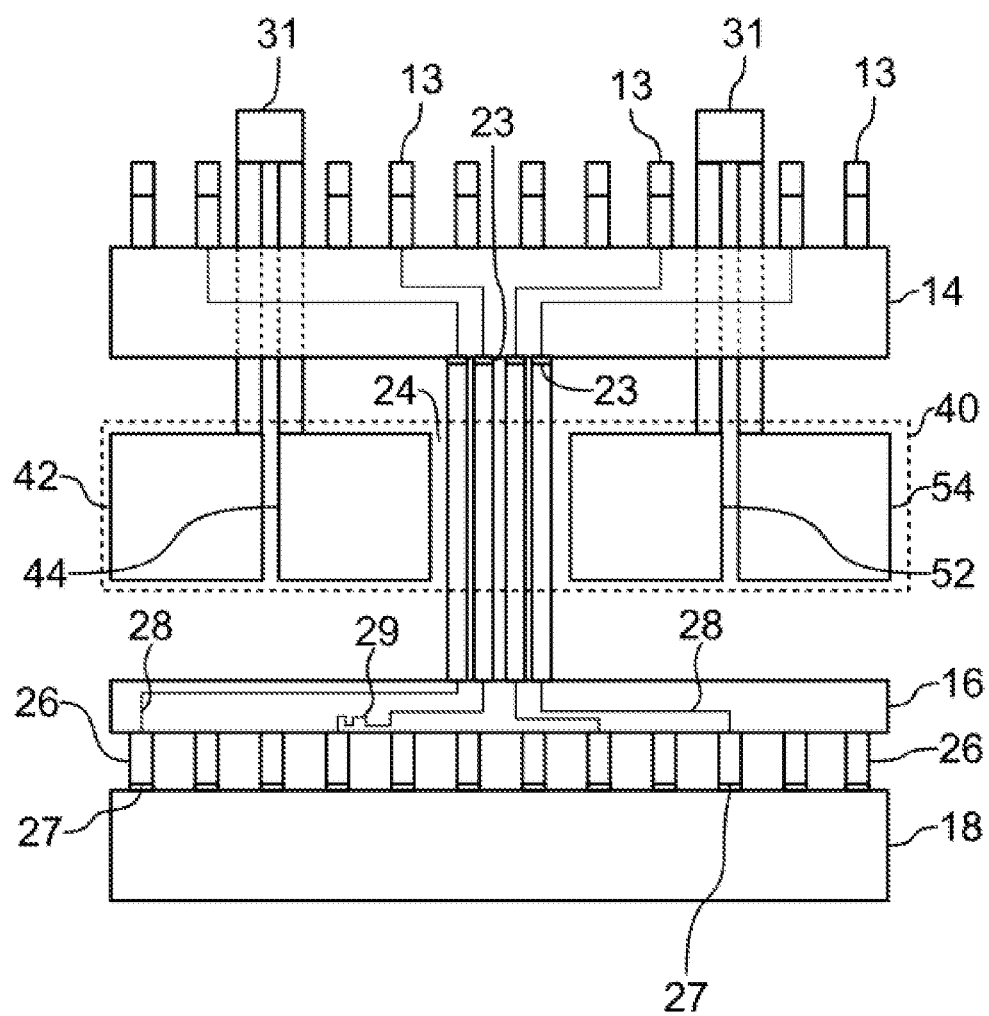
FIG. 2 shows a schematic cross-section through a multiband antenna system according to a further embodiment.

The further embodiment shown in FIG. 2 follows similar construction principles so that similar features are designated with the same reference numerals as before. To avoid unnecessary repetition, features that have an identical or mostly identical function as before will not be described again.

In this embodiment, the transition device 16 comprises first connectors 23 for connecting to the feeding network 14 of the first mMIMO antenna array 12 and second connectors 27 for connecting to the mMIMO RF module 18. The transition device 16 further comprises interconnections between the first connectors 23 and the second connectors 27. Each of the interconnection comprises a first part 22 connected to a first connector 23, a second part 26 connected to a second connector 27 and a connecting part 28 which routes signals between a first part 22 and a second part 26. Each connecting part 28 may connect exactly one of the first parts 22 to exactly one of the second parts 26.

The connecting parts 28 may comprise delay sections 29. These delay sections 29 increase the physical and thus the electrical length of any connecting part 28 which comprises them. By selecting and implementing appropriate delay sections 29, the phase of all the interconnections or a predetermined selection of interconnections may be equalised.

The connecting parts 28 may be implemented as metal layers on a printed circuit board (PCB). The first and second parts 22, 26 may be implemented as cylindrical pins or other applicable waveguides. Several different types of connectors may be used as connectors 23, 27. In one embodiment, connections may be made for example with MMBX connectors.

The distribution layer 40 comprises four distribution subnetworks 42, 44, 52, 54. The first distribution subnetworks 42, 52 carry signals having a first polarisation and the second distribution subnetworks 44, 54 carry signals having a second polarisation. The distribution subnetworks 42, 44, 52, 54 are connected to second antenna elements 31 comprised in a second antenna array 30. A gap 24 is left open between the second distribution subnetwork 44 and the first distribution subnetwork 52.

The first parts 22 physically traverse the distribution layer 40 through the gap 24. The first connectors 23 connect with the feeding network 14 which routs each of the signals transmitted via the first connectors 23 to one or more first antenna elements 13 comprised in the first mMIMO antenna array 12.

Embodiments described herein allow the coexistence of a mMIMO system with several passive antenna arrays as it provides a way to suitably interconnect all the antenna arrays and feeding systems and networks while keeping the geometric volume of the antenna system at a minimum. The reduced size simplifies new site acquisition and site upgrades. Existing mechanical support structures may be reused as the wind load of the antenna system may be equivalent to that of previously installed antenna systems. Due to the increased number of ports, it may be suitable for site-sharing which significantly reduces the operating costs of network operators.

The invention has been described in conjunction with various embodiments herein. However, other variations to the disclosed embodiments can be understood and affected by those skilled in the art in practising the claimed invention, from a study of the drawings, the disclosure, and the appended claims. In the claims, the word "comprising" does not exclude other elements or steps, and the indefinite article "a" or "an" does not exclude a plurality. The number of certain elements used in the embodiments may be changed according to the needs as determined by the skilled person, e.g. the number of antenna elements, distribution networks, antenna arrays and the numbers given herein shall not be understood to delimit the invention. The mere fact that certain measures are recited in mutually different dependent claims does not indicate that the combination of these measures cannot be used to advantage. Although the present invention and its advantages have been described in detail, it should be understood that various changes, substitutions, alterations, modifications and combinations can be made herein without departing from the spirit and scope of the invention as defined by the appended claims.

LIST OF REFERENCE NUMERALS 10 multi-band antenna system
12 first mMIMO antenna array
13 first antenna element
14 feeding network
16 transition device
18 mMIMO RF module
20 mMIMO input
22 first part
23 first connector
24 gap
26 second part
27 second connector
28 connecting part 29 delay section
30 second antenna array
31 second antenna element
32 third antenna array
34 fourth antenna array
40 distribution layer
42 first distribution sub-network
44 second distribution sub-network
46 antenna input
52 first distribution sub-network
54 second distribution sub-network
56 antenna input
62 first distribution sub-network
64 second distribution sub-network
66 antenna input

What is claimed is:

1. A multiband antenna system, comprising:
a first massive multiple input multiple output (mMIMO) antenna array comprising a plurality of first antenna elements configured for use in a first frequency band;
a second antenna array comprising a plurality of second antenna elements configured for use in a second frequency band, the second frequency band being lower than the first frequency band, and the second antenna array being at least partially interleaved with the first mMIMO antenna array;
a distribution network configured to distribute input and/or output signals of the plurality of second antenna elements arranged in a distribution layer;
a feeding network, the feeding network having a plurality of outputs connected to the plurality of first antenna elements; and
a transition device comprising:
a first set of first connectors disposed to a first side of the distribution layer and connected to a plurality of inputs of the feeding network,
a second set of second connectors disposed to a second side of the distribution layer and connected to a mMIMO radio frequency (RF) module, and
interconnections connecting the first set of first connectors to the second set of second connectors, the interconnections traversing the distribution layer.

2. The antenna system according to claim 1, wherein the first mMIMO antenna array comprises a reflector, and wherein the distribution layer is arranged in parallel to the reflector.

3. The antenna system according to claim 1, wherein the distribution network comprises gaps through which the interconnections traverse the distribution network.

4. The antenna system according to claim 3, wherein each interconnection comprises a first part traversing the distribution network to connect with a respective first connector, a second part configured to connect to a respective second connector, and a connecting part configured to route signals between the first part and the second part.

5. The antenna system according to claim 4, wherein the respective first part of each respective interconnection is a respective first waveguide, and wherein the respective second part of each respective interconnection is a respective second waveguide.

6. The antenna system according to claim 5, wherein the respective connecting part of each respective interconnection is a metal layer on a printed circuit board.

7. The antenna system according to claim 6, wherein the connecting parts of respective interconnections include respective delay sections, the respective delay sections increasing the electrical lengths of the connecting parts to equalize a phase of each signal for each of the first antenna elements.

8. The antenna system according to claim 3, wherein the distribution network is physically split into distribution sub-networks for different polarisations, wherein the gaps are arranged between the distribution sub-networks.

9. The antenna system according to claim 1, wherein each respective first connector is connected by a respective interconnection to a respective second connector.

10. The antenna system according to claim 1, wherein the interconnections equalize a phase of each signal for each of the first antenna elements.

11. The antenna system according to claim 10, wherein the interconnections have individual physical lengths for providing the equalization.

12. The antenna system according to claim 1, further comprising the mMIMO RF module, the mMIMO RF module configured to drive the first mMIMO antenna array, wherein the second connectors are connected to the mMIMO RF module.

13. The antenna system according to claim 1, wherein the feeding network provides a feeding connection to more than one of the first antenna elements for one of the first connectors.

* * * * *